(12) United States Patent
Shanmugaraju et al.

(10) Patent No.: US 11,140,563 B2
(45) Date of Patent: Oct. 5, 2021

(54) DYNAMIC QUANTIZED SIGNATURE VECTOR SELECTION FOR A CLOUD RADIO ACCESS NETWORK

(71) Applicant: CommScope Technologies LLC, Hickory, NC (US)

(72) Inventors: Naveen Shanmugaraju, Bangalore (IN); Anil Bapat, Bangalore (IN)

(73) Assignee: CommScope Technologies LLC, Hickory, NC (US)

(*) Notice: Subject to any disclaimer, the term of this patent is extended or adjusted under 35 U.S.C. 154(b) by 52 days.

(21) Appl. No.: 16/674,587

(22) Filed: Nov. 5, 2019

(65) Prior Publication Data

US 2020/0187021 A1 Jun. 11, 2020

Related U.S. Application Data

(60) Provisional application No. 62/794,574, filed on Jan. 19, 2019.

(30) Foreign Application Priority Data

Dec. 7, 2018 (IN) .............................. 201811046464

(51) Int. Cl.
*H04W 24/02* (2009.01)
*H04W 72/08* (2009.01)
(Continued)

(52) U.S. Cl.
CPC ............ *H04W 24/02* (2013.01); *G06N 20/00* (2019.01); *H04L 1/203* (2013.01); *H04W 28/24* (2013.01);
(Continued)

(58) Field of Classification Search
CPC ..... H04W 24/02; H04W 24/04; H04W 24/08; H04W 28/24; H04W 52/26;
(Continued)

(56) References Cited

U.S. PATENT DOCUMENTS

2014/0244808 A1* 8/2014 Axelrod ................ H04L 41/042
709/220
2015/0332145 A1 11/2015 Vasseur et al.
(Continued)

OTHER PUBLICATIONS

3GPP, "3rd Generation Partnership Project; Technical Specification Group Radio Access Network; Study on new radio access technology: Radio access architecture and interfaces (Release 14)", 3GPP TR 38.801 V14.0.0, Mar. 2017, pp. 1-91, 3GPP.
(Continued)

*Primary Examiner* — Candal Elpenord
(74) *Attorney, Agent, or Firm* — Fogg & Powers LLC (57) ABSTRACT

A communication system is disclosed. The communication system includes a plurality of radio points, each configured to exchange radio frequency (RF) signals with a plurality of wireless devices at a site. The communication system also includes a baseband controller communicatively coupled to the plurality of radio points. The communication system also includes a machine learning computing system communicatively coupled to the baseband controller. The machine learning computing system is configured to determine an expected average throughput associated with each of a plurality of global quantized signature vectors (QSVs), using a Q-function approximation, based on a current state of the communication system. The communication system is also configured to select a global QSV associated with a highest expected average throughput.

19 Claims, 5 Drawing Sheets

(51) Int. Cl.
  *H04W 28/24* (2009.01)
  *H04L 1/20* (2006.01)
  *H04W 52/26* (2009.01)
  *G06N 20/00* (2019.01)

(52) U.S. Cl.
  CPC ......... *H04W 52/26* (2013.01); *H04W 72/085* (2013.01)

(58) Field of Classification Search
  CPC ... H04W 72/085; H04W 72/04; H04W 72/02; G06N 20/00; H04L 1/203
  USPC ........................................................ 370/252
  See application file for complete search history.

(56) References Cited

U.S. PATENT DOCUMENTS

| | | | | |
|---|---|---|---|---|
| 2016/0037550 | A1* | 2/2016 | Barabell | H04W 72/046 |
| | | | | 455/450 |
| 2016/0072691 | A1* | 3/2016 | Xu | H04B 7/18578 |
| | | | | 370/252 |
| 2016/0183248 | A1 | 6/2016 | Niu et al. | |
| 2016/0198471 | A1* | 7/2016 | Young | H04W 16/14 |
| | | | | 370/329 |
| 2017/0272317 | A1* | 9/2017 | Singla | H04W 12/06 |
| 2018/0205501 | A1 | 7/2018 | Jana et al. | |
| 2018/0234302 | A1 | 8/2018 | James et al. | |

OTHER PUBLICATIONS

Bapat, Anil et al., "Dynamic Sectorization in a System With Multiple Cloud Radio Access Networks", U.S. Appl. No. 16/674,566, filed Nov. 5, 2019, pp. 1-54, Published: US.
Bapat, Anil et al., "Location Determination With a Cloud Radio Access Network", U.S. Appl. No. 16/674,547, filed Nov. 5, 2019, pp. 1-47, Published: US.
ETSI, "Experiential Networked Intelligence (ENI); ENI use cases", ETSI GR ENI 001 V1.1.1 Group Report, Apr. 2018, pp. 1-43, ETSI.
International Searching Authority, "International Search Report and Written Opinion from PCT Application No. PCT/US2019/059912", from Foreign Counterpart to U.S. Appl. No. 16/674,587, dated Apr. 7, 2020, pp. 1 through 8, Published: WO.
Raghothaman, Balaji B. et al., "Location Determination in a Cloud Radio Access Network Utilizing Image Data", U.S. Appl. No. 16/783,479, filed Feb. 6, 2020, pp. 1 through 45, Published: US.

* cited by examiner

DYNAMIC QUANTIZED SIGNATURE VECTOR SELECTION FOR A CLOUD RADIO ACCESS NETWORK

CROSS-REFERENCE TO RELATED APPLICATIONS

This application claims the benefit of Indian Provisional Patent Application Serial No. 201811046464 filed on Dec. 7, 2018, entitled "DYNAMIC QUANTIZED SIGNATURE VECTOR SELECTION FOR A CLOUD RADIO ACCESS NETWORK"; and U.S. Provisional Patent Application Ser. No. 62/794,574 filed on Jan. 19, 2019, entitled "DYNAMIC QUANTIZED SIGNATURE VECTOR SELECTION FOR A CLOUD RADIO ACCESS NETWORK", the entirety of both of which are incorporated herein by reference.

BACKGROUND

Distributed base stations (such as a cloud radio access network (C-RAN)) may utilize multiple, geographically-separated radio points to provide wireless service to wireless devices in a coverage area. It may be beneficial to assign radio point(s) for each different wireless device in a way that maximizes one or more conditions in the C-RAN. Therefore, the present systems and methods describe dynamic quantized signature vector (QSV) selection for a C-RAN.

SUMMARY

A communication system is disclosed. The communication system includes a plurality of radio points, each configured to exchange radio frequency (RF) signals with a plurality of wireless devices at a site. The communication system also includes a baseband controller communicatively coupled to the plurality of radio points. The communication system also includes a machine learning computing system communicatively coupled to the baseband controller. The machine learning computing system is configured to determine an expected average throughput associated with each of a plurality of global quantized signature vectors (QSVs), using a Q-function approximation, based on a current state of the communication system. The communication system is also configured to select a global QSV associated with a highest expected average throughput.

A method for dynamic quantized signature vector (QSV) selection in a communication system is also disclosed. The communication system includes a baseband controller and a plurality of radio points. Each radio point is configured to exchange radio frequency (RF) signals with a plurality of wireless devices at a site. The method includes determining an expected average throughput associated with each of a plurality of global QSVs, using a Q-function approximation, based on a current state of the communication system. The method also includes selecting a global QSV associated with a highest expected average throughput.

DRAWINGS

Understanding that the drawings depict only exemplary configurations and are not therefore to be considered limiting in scope, the exemplary configurations will be described with additional specificity and detail through the use of the accompanying drawings, in which.

In accordance with common practice, the various described features are not drawn to scale but are drawn to emphasize specific features relevant to the exemplary configurations.

DETAILED DESCRIPTION

The term Radio Access Network (RAN) refers to the part of a mobile communication network, that connects wireless devices to the fixed network infrastructure through wireless radio channels, over specific radio-frequencies. A cloud radio access network (C-RAN) is a point-to-multipoint distributed base station with one or more baseband controllers that are physically separated from, and communicatively coupled to, multiple radio points (RPs).

Since available radio frequencies are limited, the same radio resources may need to be reused, e.g., for wireless devices that are separated by a sufficient distance. Such reuse is possible because radio signals get attenuated over distance. Conventionally, a cellular model of frequency reuse is used, where a coverage area is divided into geographic region called cells, and radio resources are reused across cells. Inter-cell interference is a major problem that is present in this architecture, that degrades user experience, especially for cell-edge users.

In contrast, the C-RAN described herein may utilize cell virtualization rather than cellular reuse. Cell virtualization may detect a wireless device's location from sounding signal measurements, and reuse radio-resources across wireless devices that have been determined to have sufficient isolation between them so as not to cause significant interference to each other. In other words, rather than constructing static cells (as in the cellular model), the C-RAN may construct a dynamic, virtual cell around each wireless device based on the wireless device's location.

In a C-RAN, the radio transmission/reception may occur at the RPs that are distributed across the coverage region. The baseband controller may handle the baseband data and also control the transmission/reception at the RPs. Specifically, the baseband controller may be responsible for cell virtualization, where radio-resources on RPs are assigned to different wireless devices based on their location, e.g., the assignment of resources may be made so that signals communicated between the different wireless devices and the RPs do not cause significant interference to each other. The set of RPs that are selected for a particular wireless device may be referred to as its QSV (Quantized Signature Vector). In some systems, when two wireless devices have non-overlapping QSVs, they can reuse the same radio-resource.

The QSV for a wireless device may be determined based on one or more of many factors, e.g., the relative (radio) path-strengths from the wireless device to all RPs in the C-RAN, the load measured at different RPs (e.g., measured dynamically to account for changes in UE position), cell load, etc. More specifically, the QSV for a wireless device may be chosen to optimize one or more conditions of the C-RAN, e.g., achieve a at least a minimum average throughput across all wireless devices served by the C-RAN.

Figure 1A:
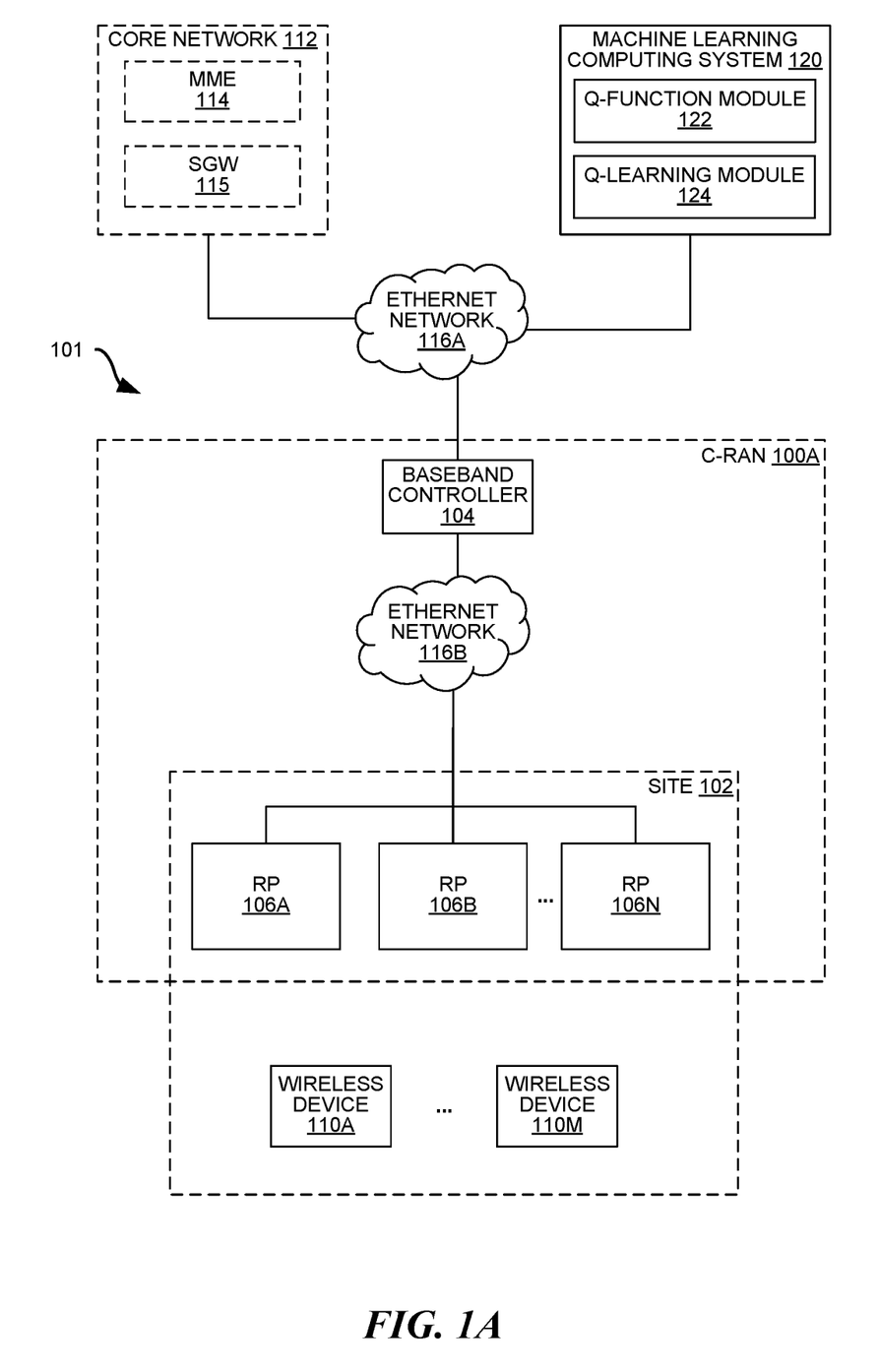
FIG. 1A is a block diagram illustrating an exemplary configuration of a system implementing dynamic quantized signature vector (QSV) selection for a C-RAN.

FIG. 1 is a block diagram illustrating an exemplary configuration of a system 101 implementing dynamic quantized signature vector (QSV) selection for a C-RAN 100A. The system 101 may provide wireless service/coverage and capacity for one or more wireless network operators.

In the exemplary configuration shown in FIG. 1, the C-RAN 100A may utilize a point-to-multipoint distributed base station architecture that employs at least one (and optionally multiple) baseband unit 104 and multiple (i.e., N) radio points (RPs) 106A-N that serve at least one cell. The C-RAN 100A may also be referred to herein as a "C-RAN system," and/or an "eNodeB" (or "eNB"). The baseband unit 104 is also referred to herein as a "baseband controller" 104 or just a "controller" 104. Each RP 106 may include or be coupled to at least one (e.g., two) antennas via which downlink RF signals are radiated to wireless devices 110A-M and via which uplink RF signals transmitted by wireless devices 110 are received.

The RPs 106 and wireless devices 110 connected to (e.g., served by) the C-RAN 100A may be located at a site 102. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). For example, the site 102 may be at least partially indoors, but other alternatives are possible.

It should be noted that the baseband controller 104 may or may not be located at the site 102 (with the RPs 106). For example, the baseband controller 104 may be physically located remotely from the RPs 106 (and the site 102) in a centralized bank of baseband controllers 104. Additionally, the RPs 106 are physically separated from each other within the site 102, although they are each communicatively coupled to the baseband controller 104.

Each wireless device 110 may be a computing device with a processor that executes instructions stored in memory, e.g., a mobile phone, tablet computer, mobile media device, mobile gaming device, laptop computer, vehicle-based computer, a desktop computer, etc. It should be noted that any number of wireless devices 110 (e.g., M=1-1,000) may be present at the site 102.

The C-RAN 100A may be coupled to the core network 112 of each wireless network operator over an appropriate back-haul ETHERNET network 116A. For example, the Internet may be used for back-haul between the system 101 and each core network 112. However, it is to be understood that the back-haul ETHERNET network 116A can be implemented in other ways. The ETHERNET networks 116 described herein may be implemented with one or more switches, routers, and/or other networking devices.

In some configurations, the system 101 may be implemented as a Long Term Evolution (LTE) radio access network providing wireless service using an LTE air interface. However, it should be noted that the present systems and methods may be used with other wireless protocols, e.g., 5G. LTE is a standard developed by 3GPP standards organization. In the LTE configuration, the baseband controller 104 and RPs 106 together (C-RAN 100A) may be used to implement an LTE Evolved Node B (also referred to here as an "eNodeB" or "eNB"). An eNB may be used to provide wireless devices 110 with mobile access to the wireless network operator's core network 112 to enable wireless device 110 to wirelessly communicate data and voice (using, for example, Voice over LTE (VoLTE) technology).

Also, in an exemplary LTE configuration, each core network 112 may be implemented as an Evolved Packet Core (EPC) 112 comprising standard LTE EPC network elements such as, for example, a mobility management entity (MME) 114 and a Serving Gateway (SGW) 115 and, optionally, a Home eNB gateway (HeNB GW) (not shown) and a Security Gateway (SeGW) (not shown).

Moreover, in an exemplary LTE configuration, the baseband controller 104 may communicate with the MME 114 and SGW 115 in the EPC core network 112 using the LTE S1 interface and communicates with eNBs using the LTE X2 interface. For example, the baseband controller 104 can communicate with an outdoor macro eNB (not shown) via the LTE X2 interface.

Each baseband controller 104 and radio point 106 can be implemented so as to use an air interface that supports one or more of frequency-division duplexing (FDD) and/or time-division duplexing (TDD). Also, the baseband controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the baseband controller 104 and the radio points 106 can implement one or more of the LTE transmission modes. Moreover, the baseband controller 104 and the radio points 106 can be configured to support multiple air interfaces and/or to support multiple wireless operators.

In the exemplary configurations shown in FIG. 1, the front-haul that communicatively couples each baseband controller 104 to the one or more RPs 106 is implemented using a standard ETHERNET network 116B. However, it is to be understood that the front-haul between the baseband controller 104 and RPs 106 can be implemented in other ways.

The Third Generation Partnership Project (3GPP) has adopted a layered model for the LTE radio access interface. Generally, the baseband controller 104 and/or RPs 106 perform analog radio frequency (RF) functions for the air interface as well as digital Layer 1, Layer 2, and Layer 3 (of the 3GPP-defined LTE radio access interface protocol) functions for the air interface.

In one example, each baseband controller 104 comprises Layer 3 (L3) functionality, Layer 2 (L2) functionality, and Layer 1 (L1) functionality configured to perform at least some of the L3 processing, L2 processing, and L1 processing, respectively, for the LTE air interface implemented by the C-RAN 100A, and each RP 106 includes (optionally) L1 functionality that implements any L1 processing for the air interface that is not performed in the baseband controller 104 and one or more radio frequency (RF) circuits that implement the RF front-end functions for the air interface and the one or more antennas associated with that RP 106.

Other possible functional splits between the baseband controller 104/RPs 106 of the L1-L3 processing for the air interface include: (1) all L1-L3 processing in baseband controller 104; (2) all L2 and L3 processing in baseband controller 104/all L1 processing in RPs 106; (3) all L3 and some L2 processing in baseband controller 104/all L1 and some L2 processing in RPs 106; (4) all L3 processing in baseband controller 104/all L1-L2 processing in RPs; (5)

some L3 processing in baseband controller 104/some L3 and all L1-L2 processing in the RPs 106. In some configurations, all RF front-end processing for the air interface and the one or more antennas is performed in the RPs 106, e.g., the baseband controller 104 does not perform any RF processing for the air interface or the antennas (although other configurations are possible).

In some configurations (e.g., where all the L1-L3 processing is performed in the baseband controller 104), IQ data representing time-domain symbols for the air interface is communicated between the baseband controller 104 and the RPs 106. Communicating such time-domain IQ data typically requires a relatively high data rate front haul. This approach (communicating time-domain IQ data over the front haul) is suitable for those implementations where the front-haul ETHERNET network 116B is able to deliver the required high data rate.

If the front-haul ETHERNET network 116B is not able to deliver the data rate needed to front haul time-domain IQ data (for example, where the front-haul is implemented using typical enterprise-grade ETHERNET networks), this issue can be addressed by communicating IQ data representing frequency-domain symbols for the air interface between the baseband controller 104 and the RPs 106. This frequency-domain IQ data represents the symbols in the frequency domain before the inverse fast Fourier transform (IFFT) is performed. The time-domain IQ data can be generated by quantizing the IQ data representing the frequency-domain symbols without guard band zeroes or any cyclic prefix and communicating the resulting compressed, quantized frequency-domain IQ data over the front-haul ETHERNET network 116B.

Where frequency-domain IQ data is front-hauled between the baseband controller 104 and the RPs 106, each baseband controller 104 can be configured to perform all or some of the digital L3, L2, and L1 processing for the air interface. In this case, the L1 functions in each RP 106 can be configured to implement the digital L1 processing for the air interface that is not performed in the baseband controller 104. For example, in this exemplary configuration, each baseband controller 104 may implement a receiver and a scheduler for the cell.

Where the front-haul ETHERNET network 116B is not able to deliver the data rate need to front haul (uncompressed) time-domain IQ data, the time-domain IQ data can be compressed prior to being communicated over the ETHERNET network 116B, thereby reducing the data rate needed communicate such IQ data over the ETHERNET network 116B.

Data can be front-hauled between the baseband controller 104 and RPs 106 in other ways (for example, using front-haul interfaces and techniques specified in the Common Public Radio Interface (CPRI) and/or Open Base Station Architecture Initiative (OBSAI) family of specifications).

Although not shown, a management system may be communicatively coupled to the baseband controller 104 and RPs 106, for example, via the ETHERNET network 116A and the ETHERNET network 116B (in the case of the RPs 106). The management system may send and receive management communications to and from the baseband controller 104, which in turn forwards relevant management communications to and from the RPs 106.

A machine learning computing system 120 may be communicatively coupled to the baseband controller 104 (e.g., via the ETHERNET network 116A) and the RPs 106 (e.g., via the ETHERNET network 116B). In one configuration, the machine learning computing system 120 may be implemented with at least one general-purpose computing device (e.g., server) equipped with at least one (and optionally more than one) processor (e.g., graphics processing unit (GPU)) for faster machine-learning-based processing. In some configurations, the machine learning computing system 120 may be implemented in more than one physical housing, each with at least one GPU. The machine learning computing system 120 may be coupled to and serve a single C-RAN 100A or multiple C-RANs 100A (e.g., each with at least one baseband controller 104 and multiple RPs 106) based on deployment needs and scale.

The machine learning computing system 120 may select a QSV for each (or a subset) of the wireless devices 110 at the site 102 at a given time. The collective QSVs (e.g., the aggregation of the QSVs for all (or a subset) of the wireless devices 110 connected to the C-RAN 100A) may be referred to as a "global QSV". The global QSV may be selected in order to optimize one or more conditions of the C-RAN 100A. For example, the global QSV could be chosen to maximize overall throughput across all (or a set of) wireless devices 110 connected to/served by the C-RAN 100A, e.g., achieve at least a minimum system 101 throughput. Alternatively, the global QSV may be selected based on a desired Quality of Service (QoS) for the wireless devices 110; to minimize (e.g., achieve less than a threshold) load on a highest-loaded RP 106; and/or to minimize (e.g., achieve less than a threshold) average user backlog associated with the wireless devices 110. The global QSV may be selected in order to minimize, maximize, or otherwise optimize other conditions within the C-RAN 100A. Furthermore, certain functions involving throughput, QoS, RP 106 loading, and/or user backlog associated with a wireless device 110 may be optimized, e.g., the global QSV may be selected to maximize a weighted sum of individual wireless device 110 throughputs, where the weighting is based on service class of the wireless device 110.

Using the example where the global QSV is selected to maximize overall throughput across all (or a set of) wireless devices 110, a tradeoff may exist when selecting a QSV for a particular wireless device 110. First, using a smaller QSV for the wireless device 110 (less RPs 106 communicating with the particular wireless device 110) may increase the likelihood of frequency reuse among different wireless devices 110 and may lead to an increase in overall throughput. Second, a larger QSV for the wireless device 110 (more RPs 106 communicating with the particular wireless device 110) may decrease the chance of frequency reuse among different wireless devices 110 but could increase the signal quality for the wireless device and improve overall throughput. Similar tradeoffs may exist when the global QSV is selected based on other conditions (other than throughput). As used herein, the term overall throughput refers to any metric that indicates an amount of data collectively transmitted to and/or from all (or a set of) the wireless devices 110 connected to/served by the C-RAN 100A per unit time. For example, the overall throughput may be measured in bits per second (e.g., Mbps) and may be based on one or more factors, e.g., channel bandwidths, channel qualities, network load, etc.

In some configurations, the machine learning computing system 120 may attempt to balance factors affecting throughput across all the wireless devices 110 connected to (e.g., served by) the C-RAN 100A when selecting a global QSV for the system 101. Additionally, the cell-wide, global QSV selection may influence the channel quality for the different wireless devices 110, and hence the behavior of a scheduler (e.g., in the baseband controller 104), which may be channel-aware and backlog-aware. The selection of QSVs may thus influence which mobile devices 110 are serviced quickly, how much backlog is built up for different wireless devices 110, etc. This in turn may affect the future state of the system 101. So, the machine learning computing system 120 may select a global QSV to maximize the expected average throughput of the system 101 considering the future evolution of the system 101 and the current state of the system 101.

As described below, the machine learning computing system 120 may (1) model the dynamic QSV selection problem as a Markov Decision Process (MDP); and (2) solve the MDP using Q-learning. For example, a Q-function module 122 in the machine learning computing system 120 may implement a Q-function approximation (e.g., lookup table) that receives the state of the system 101 and determines the global QSV using a Q-function, e.g., iteratively every 200-500 ms. The state of the system 101 may be determined based on various conditions within the system 101. Furthermore, a Q-learning module 124 in the machine learning computing system 120 may modify/adapt the Q-function approximation (implemented by the Q-function module) based on actual results of the selected global QSV on the system 101.

The signature vectors referred to herein may be determined using Sounding Reference Signals (SRSs) or any other type (or combination) of signal received at the RPs 106 from the wireless device(s) 110. A Sounding Reference Signal (SRS) is a periodic uplink signal that may be used to estimate uplink channel quality. Each wireless device 110 connected to the C-RAN 100A (e.g., and at the site 102) may periodically transmit an SRS on the uplink, e.g., once every 80 ms-160 ms.

In some configurations, a signature vector may be determined for each combination of wireless device 110 and RP 106 (that receives wireless signals from the wireless device 110) in the system 101. For example, each wireless device 110 (e.g., LTE device) may periodically transmit an SRS on the uplink.

The RPs 106 in the C-RAN 100A may be strategically located across the entire site 102 to provide optimal coverage to most (or all) physical locations in the site 102. In some configurations, each of the RPs 106 may receive an SRS from each of the connected wireless devices 110 and report at least one metric to the baseband controller 104 (although less than all the RPs 106 may receive an SRS from less than all of the connected wireless devices 110). The signature vectors may be determined using any number of metrics derived from the SRS received at the RPs 106, also called "SRS metrics" herein. The SRS metric(s) extracted by each receiving RP 106 may be used (by the baseband controller 104) to determine a signature vector. SRS metrics may be based on one or more of the following: (1) an SRS power measurement; (2) a channel impulse response for the wireless device 110, e.g., measured from an SRS; (3) an angle of arrival for the SRS; and/or (4) at least one previous signature vector for the wireless device 110. In some configurations, each signature vector may be determined using the SRS power of an SRS and the channel impulse response for the SRS (from a particular wireless device 110), but no other SRS metrics.

A channel impulse response may be determined for a wireless device 110 as follows. Uplink signals (e.g., SRS) sent by a wireless device 110 may reach the RPs 106 over multiple paths, which leads to multiple signal amplitudes measured with small delays. So, each RP 106 may measure these various signal amplitudes as well as the delay times and form a vector of these measurements, which is the channel impulse response of the SRS signal. Channel impulse response measurements of a wireless device's 110 SRS signal from all the RPs 106 in the site 102 may be strongly correlated with the user's pinpointed location, taking into effect both the distances of the wireless device 110 from each RP 106 as well as the unique multipath characteristics of that particular location of the wireless device 110 relative to each RP 106.

The signature vectors described herein may optionally be used to determine an RP 106 having the best signal reception metric for a wireless device 110, e.g., by scanning or sorting the elements of the signature vector to find the element having the best signal reception metric. The RP 106 that corresponds to that "best" element may also referred to as the "primary RP" 106 for the wireless device 110. Furthermore, a secondary cell signature vector may be determined, at least partially, based on a primary cell signature vector and a physical location for a wireless device 110.

A "quantized signature vector" (QSV) may be determined for all (or a subset) of wireless devices 110 connected to a C-RAN 100A and/or located at a site 102. For example, a QSV for a wireless device 110 may be determined based on a signature vector for the wireless device 110. In one configuration, the QSV(s) may be determined at the baseband controller 104. A "simulcast zone" may be a subset of RPs 106 in a C-RAN 100A that are used to transmit to a particular wireless device 110, e.g., each wireless device 110 may have a simulcast zone that may or may not overlap with a simulcast zone for another wireless device 110. A QSV for a wireless device 110 may be a vector that includes an element for each RP 106, where each element has one of a finite set of values. For example, the element for an RP 106 may have a first value (for example, a value of "1") if the RP 106 is included in the simulcast zone for that wireless device 110 and may have a second value (for example, a value of "0") if the RP 106 is not included in the simulcast zone for that wireless device 110.

Optionally, the QSVs for the wireless devices 110 may be used to conveniently determine if the simulcast zones of two wireless devices 110 do not include any of the same RPs 106. That is, the QSVs for two wireless devices 110 can be used to determine if the simulcast zones for the two wireless devices 110 are disjoint (e.g., do not have a value of "1" at corresponding elements). If this is the case, the simulcast zones for the wireless devices 110 (and the wireless devices 110 themselves) are referred to as being "orthogonal" to each other. This can be done, for example, applying a logical "AND" operation on corresponding elements of the two QSVs.

Figure 1B:
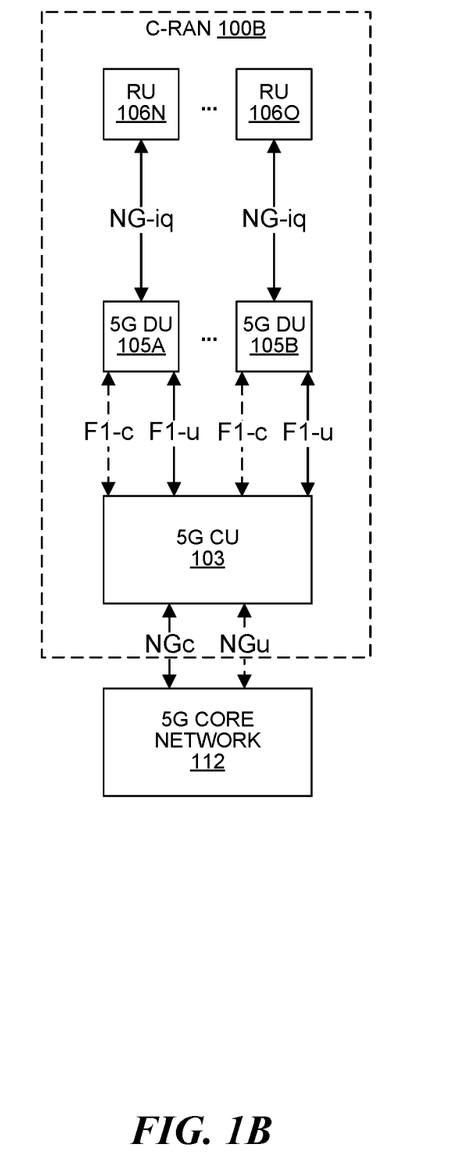
FIG. 1B is a block diagram illustrating another exemplary configuration of a system implementing dynamic quantized signature vector (QSV) selection for a C-RAN.

FIG. 1B is a block diagram illustrating another exemplary configuration of a system implementing dynamic quantized signature vector (QSV) selection for a C-RAN 100B. The system 100B includes 3GPP Fifth Generation (5G) components. Optionally, the system 100B may additionally include 4G components. Each of the components may be implemented using at least one processor executing instructions stored in at least one memory. In some configurations, at least some of the components are implemented using a virtual machine.

Fifth Generation (5G) standards support a wide variety of applications, bandwidth, and latencies while supporting various implementation options. In the system 100, interfaces denoted with "-c" or simply "c" (illustrated with dashed lines) provide control plane connectivity, while interfaces denoted with "-u" or simply "u" (illustrated with solid lines) provide user plane connectivity. More explanation of the various devices and interfaces in FIG. 1B can be found in 3GPP TR 38.801 Radio Access Architecture and Interfaces, Release 14 (available at https://portal.3gpp.org/desktopmodules/Specifications/SpecificationDetails.aspx?specific ationId=3056), which is incorporated by reference herein.

FIG. 1B illustrates a C-RAN 100B implementing an example of a 5G Next Generation NodeB (gNB). The architecture of a Next Generation NodeB (gNB) is partitioned into a 5G Central Unit (CU) 103, one or more 5G Distributed Unit (DU) 105A-B and one or more 5G Remote Units (RU) 106N-O. A 5G Central Unit (CU) 103 is a node that includes the gNB controller functions such as the transfer of user data, mobility control, radio access network sharing, positioning, session management, etc. The 5G CU 103 controls the operation of the Distributed Units (DUs) 105A-B over an interface (including F1-c and F1-u for the control plane and user plane, respectively).

The Distributed Units (DUs) 105 may be nodes that implement a subset of the gNB functions, depending on the functional split (between CU 103 and DU 105). In some configurations, the L3 processing (of the 5G air interface) may be implemented in the CU 103 and the L2 processing (of the 5G air interface) may be implemented in the DU 105. The operation of each DU 105 is controlled by a CU 103. The functions of the DU 105 may include Radio Link Control (RLC), portions of Medium Access Control (MAC) and/or portions of the physical (PHY) layer functions. A Distributed Unit (DU) 105 can optionally offload some of its PHY (L1) processing (of the 5G air interface) to RUs 106.

In FIG. 1B, the C-RAN 100B implementing the example Next Generation NodeB (gNB) includes a single CU 103, which handles control plane functions and user plane functions. The 5G CU 103 (in the C-RAN 100B) may communicate with at least one wireless service provider's Next Generation Cores (NGC) 112 using 5G NGc and 5G NGu interfaces. In some 5G configurations (not shown), a 5G CU is split between a CU-C 103B that handles control plane functions and a CU-U 103C that handles user plane functions.

In some 5G configurations, the RUs (RUs) 106N-0 may communicate baseband signal data to the DUs 105 on an NG-iq interface. In some 5G configurations, the RUs 106 may implement at least some of the L1 and/or L2 processing. In some configurations, the RUs 106 may have multiple ETHERNET ports and can communicate with multiple switches.

Any of the interfaces in FIG. 1B may be implemented using a switched ETHERNET (or fiber) network. Additionally, if multiple CUs 103 are present (not shown), they may communicate with each other using any suitable interface, e.g., an Xn (Xn-c and Xn-u) and/or X2 interface. A fronthaul interface may facilitate any of the NG-iq, F1-c, and/or F1-u interfaces in FIG. 1B.

Although not shown in FIG. 1B, the system 100B may also include a machine learning computing system 120 (with a Q-function module 122 and a Q-learning module 122), which performs the dynamic QSV selection functions described herein. In some configurations, the machine learning computing system 120 may be communicatively coupled to the 5G CU 103 and/or the 5G core network 112 via an ETHERNET network. Accordingly, where functionality of a baseband controller 104 is discussed herein, it is equally applicable to a 5G CU 103 or 5G DU 105 in 5G configurations. Similarly, where functionality of an RP 106 is discussed herein, it is equally applicable to an RU 106 in 5G configurations. Therefore, where a C-RAN 100 is described herein, it may include 4G components (as in FIG. 1A) and/or 5G components (as in FIG. 1B).

Figure 2:
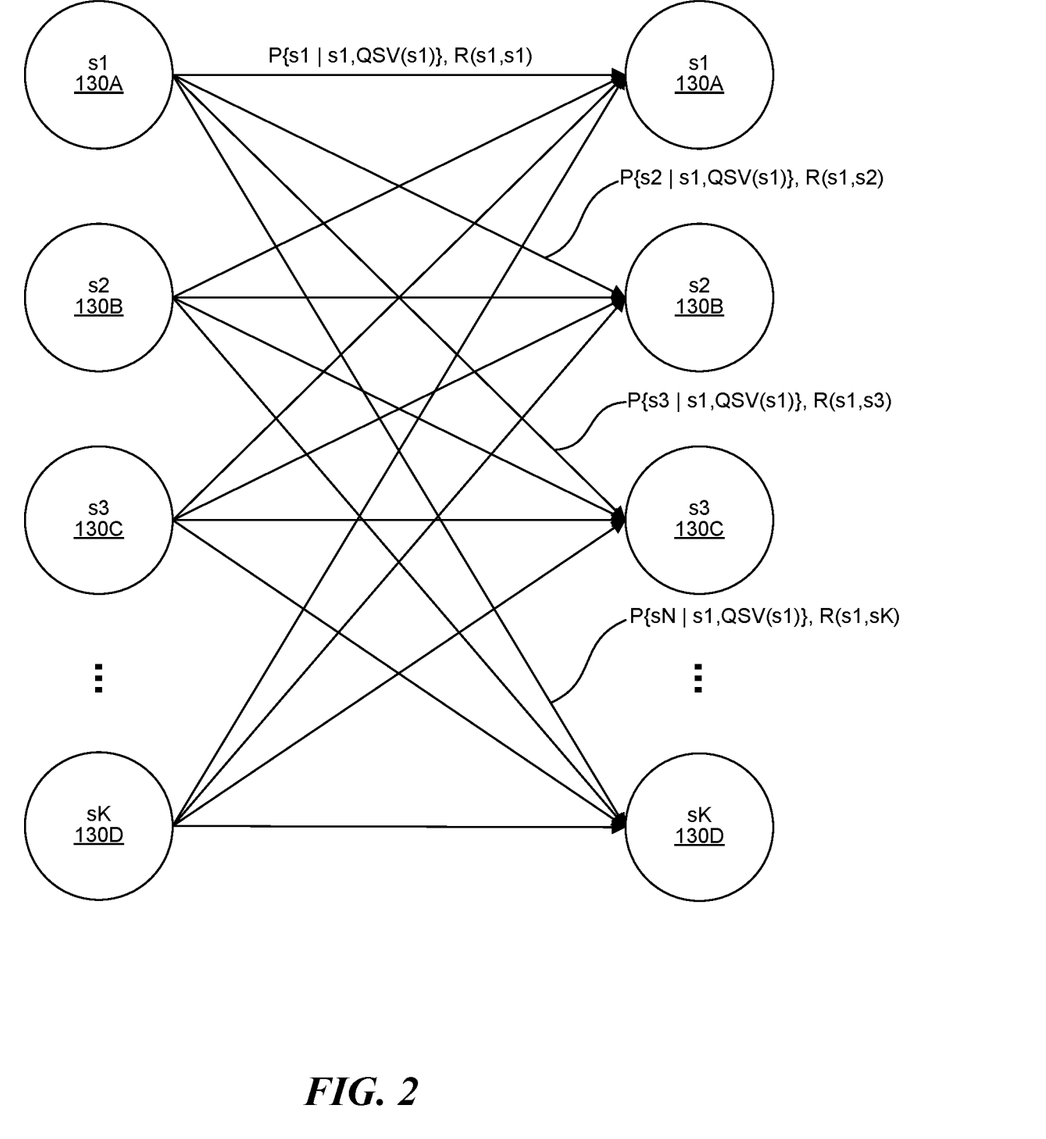
FIG. 2 is a sequence diagram illustrating exemplary state transitions in a system implementing dynamic quantized signature vector (QSV) selection for a C-RAN.

FIG. 2 is a sequence diagram illustrating exemplary state transitions in a system 101 implementing dynamic quantized signature vector (QSV) selection for a C-RAN 100.

As mentioned above, the machine learning computing system 120 may model the dynamic QSV selection problem as a Markov Decision Process (MDP). An MDP is a discrete-time, stochastic process used to model stochastic control/decision problems. MDPs may be particularly useful for problems in which there is some randomness in the solution(s), but the actions taken can also affect the solution(s). An MDP may well-suited for dynamic QSV selection because some of the factors that affect the conditions in the system 101 (e.g., overall throughput) are known and some are unknown and/or not practical to model.

An MDP may use states, actions, probabilities, rewards, and a policy to model a problem, such as dynamic QSV selection. At each time n, the MDP is at some state $s(n)$. Then, based on an action $a(n)$ that is decided based on a policy $\pi(s(n))$, the MDP moves to state $s(n+1)$, as per transition probabilities $P\{s(n+1) s(n), a(n)\}$. There is a reward $R(s(n+1), s(n))$ associated with this transition. Solving the MDP may include identifying an optimal policy $it(s)$ that maximizes the expected value of the cumulative/average reward, and not just the current reward. The term "Markov" refers to the property that the probabilities of the future states $s(n+1)$ are independent of the past, given $s(n)$ and $a(n)$.

In the context of dynamic QSV selection at a given time n, one or more of the following factors may comprise (e.g., make up) the state of the system 101: (1) the locations of at least one (e.g., all) of the active wireless devices 110 connected to the C-RAN 100 (represented by their SRS metric(s)) or the signature vectors for at least one (e.g., all) of the wireless devices 110 that are connected or the C-RAN 100; (2) a QoS priority of at least one (e.g., all) of the wireless devices 110; (3) the backlogs associated with at least one (e.g., all) of the wireless devices 110; (4) one or more channel conditions in the system 101 (e.g., indicated by Channel Quality Indicators (CQI) received at the RPs 106 and/or a Modulation and Coding Scheme (MCS) in use); and/or (5) the Block Error Rate (BLER) of at least one (e.g., all) of the wireless devices 110 in the system.

Scheduling in the system 101 may include user selection and/or resource allocation and may be performed deterministically. This deterministic scheduling behavior, along with the given selection of QSVs, may transition the process from one state to another. In other words, a particular action, namely the selection of QSVs for the wireless devices 110 (along with a given scheduling algorithm) may take the system 101 from its current state to a new state. Apart from these factors, data arrival and/or user arrival/exit may affect the next state. We assume herein that these events are independent of everything else.

A reward, namely the net system 101 throughput, may result during this transition interval. Given the current state, the reward and the new state of the system 101 may be independent of the history of the system 101, which is the Markov property.

With reference to FIG. 2, various example transitions (and associated notation) is illustrated. For example, the system 101 may be in one of K states: s1 130A, s2 130B, s3 130C, . . . sK 130D. It should be noted that even though each state 130 is shown twice for ease of illustration (once on the left of FIG. 2, once on the right of FIG. 2), both instances refer to the same state 130. Furthermore, the number of possible states 130 for the system 101 (K) may be finitely large, e.g., millions or billions.

With reference to FIG. 2, the probability P{s2|s1, QSV (s1)} is the probability of transitioning to state s2 130B, given that the system 101 started in state s1 130A and a particular set of QSVs (e.g., a global QSV based on s1 130 (the action denoted as QSV(s1)) was selected. The reward (e.g., overall throughput) associated with this transition is denoted as R(s1,s2).

More generically, the probability P{sY|sX, QSV(sX)} is the probability of transitioning to state sY 130, given that the system 101 started in state sX 130 and a particular set of QSVs (e.g., a global QSV based on sX 130 (the action denoted as QSV(sX)) was selected. The reward (e.g., overall throughput) associated with this transition is denoted as R(sX,sY).

One possible way to solve an MDP is to use a dynamic programming method (e.g., backward induction, policy iteration, etc.) to solve for the optimal policy it(s) (e.g., the policy that maximizes the expected value of the cumulative/average reward in the system 101). However, such explicit modeling and parameterization may be difficult or impossible. For example, the state-space {s} may be too large to explicitly model and/or the transition probabilities P{s(n+1)|s(n), a(n)} may be unknown. Accordingly, it may be impossible and/or impractical to explicitly model the states and/or transition probabilities when solving the MDP for dynamic QSV selection.

Instead, reinforcement learning algorithms may be used to solve the MDP. Therefore, rather than using a technique that requires explicit modeling and parameterization (e.g., dynamic programming), a Q-learning technique may be used to dynamically select QSVs (e.g., a global QSV) for the wireless devices 110 in the system 101. Like other MDP solutions, the Q-learning may maximize the cumulative (e.g., net/average) reward into the future (e.g., including the entire flow of actions that could take place after immediate action) rather than only the immediate reward of an action. However, unlike other MDP solutions (e.g., dynamic programming), Q-learning can be performed without explicitly modeling the states and/or transition probabilities. The Q-learning is described in more detail below.

Figure 3:
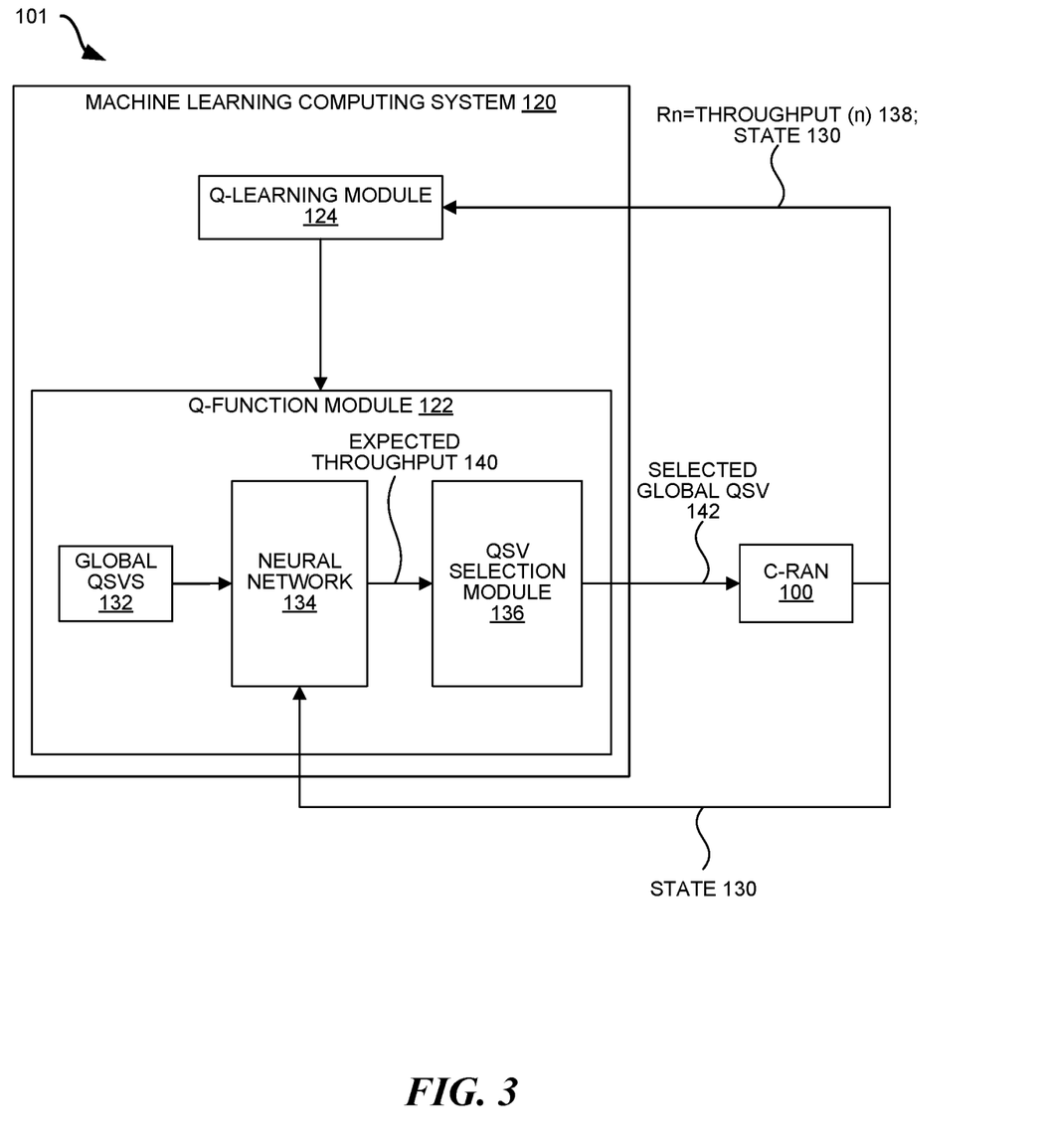
FIG. 3 is a block diagram illustrating an exemplary configuration of a system implementing dynamic quantized signature vector (QSV) selection for a C-RAN.

FIG. 3 is a block diagram illustrating an exemplary configuration of a system 101 implementing dynamic quantized signature vector (QSV) selection for a C-RAN 100. Although only illustrated with a machine learning computing system 120 and a C-RAN 100, the system 101 may also include the other devices and Ethernet networks 116 illustrated in the system 101 of FIG. 1.

Q-learning identifies an optimal policy it(s) by learning an action-value function (Q-function), which is the expected cumulative reward corresponding to taking a given action, at a current state and then following the optimal policy. The algorithm starts with an arbitrary reward estimate for each action and state: Q(s,a). This Q-function estimate is then adapted iteratively based on actual observations of the reward and state-transitions, according to Equation (1):

$$Q(s_n, a_n) \leftarrow (1-\alpha) \times Q(s_n, a_n) + R_n + \gamma \times \max_a Q(s_{n+1}, a) \quad (1)$$

where $s_n$ is the state 130 at time n; $s_{n+1}$ is the state 130 at time n+1; $a_n$ is the action taken at time n; $R_n$ 138 is the actual reward at time n; α represents a learning rate; and γ is the discount factor for future rewards.

In the context of dynamic QSV selection, the Q-function may be implemented in a Q-function module 122 and modeled according to Equation (2):

$$Q(s_n, \{QSV\}_n) \leftarrow \quad (2)$$
$$(1-\alpha) \times Q(s_n, \{QSV\}_n) + R_n + \gamma \times \max_{\{QSV\}} Q(s_{n+1}, \{QSV\})$$

where the notation {QSV} refers to the action of selecting a given global QSV (or a set of QSVs) at a given time/interval, e.g., {QSV}n is used to refer to the action of selecting a particular global QSV for time/interval n.

Therefore, the left-hand side of Equations (1) and (2) ($Q(s_n, a_n)$ and $Q(s_n, \{QSV\}_n)$, respectively) is the current estimate of the total/average reward. Then, an immediate reward of $R_n$ is learned and the state moves to $s_{n+1}$. This suggests that the total reward is $$R_n + \max_a Q(s_{n+1}, a).$$

So, a current estimate ($Q(s_n, a_n)$) is corrected/updated toward $$R_n + \max_a Q(s_{n+1}, a),$$

e.g., with some scaling.

In its simplest form, Q-learning may store and update the Q-function (Q) for all the state-action observations $\{s_n, a_n\}$. However, such a look-up table may be large and impractical to use and/or implement. Therefore, a more practical solution illustrated in FIG. 3 is to use a neural network 134 for approximating the reward function Q.

Typically, Q-learning requires a training phase, where the problem environment is explored by making random decisions and remembers the outcome. Then, once online, the Q-learning algorithm continues to learn and corrects itself when it sees deviations from the training phase.

Therefore, in some configurations, the Q-learning module 124 can be trained e.g., in a simulation environment before going live. The training may assume certain conditions in the system 101, such as the number and distribution of wireless devices 110, to produce assumed states 130 of the system 101.

However, in some cases this is not necessary since the machine learning computing system 120 may utilize on-board "greedy" QSV selection. Therefore, instead of or in addition to simulation-based training, the Q-learning module 124 may communicate with the C-RAN 100 (e.g., baseband controller 104) and can be trained from the decisions of the on-board Q-function module 122.

In one configuration, the Q-function module 122 may determine the expected average reward for a number of different global QSVs 132 (e.g., Q(s,{QSV})=E(Throughput)), given the system states 130 observed by the C-RAN 100. In other words, the Q-function module 122 may predict the expected average throughput 140 for different possible global QSVs 132 that may be selected. The C-RAN 100 (e.g., baseband controller 104) may report the current system state 130 to the Q-function module 122 (e.g., the neural network 134 in the Q-function module 122), which may then iterate through the set of global QSVs 134, after which a QSV selection module 136 may select one of the global QSV 134 with the highest expected average throughput 140 for the current state 130. The C-RAN 100 (e.g., baseband controller 104) may apply this selected global QSV 142, then report the next state 130 of the system 101 and the actual reward (throughput) 138 achieved, back to the Q-function module 122.

Specifically, the Q-function module 122 may map from the action and state 130 space to a reward (Q) space. For example, the Q-function module 122 may select a global QSV 142 with the highest expected average throughput 140 among a set of possible global QSVs 132 based on the current state 130 of the system 101.

In some configurations, the neural network 134 may approximate/implement and/or store the Q-function itself. Equations (1) or (2) (e.g., in the Q-learning module 124) may act as a Q-learning algorithm and may be used to help determine/estimate the Q-function, e.g., the input ($s_n$, $\{QSV\}_n$) and output (reward $R_n$) obtained from Equation (1) or (2) may be used to train the neural network 134 so that it would produce $R_n$ as output in response to the input ($s_n$, $\{QSV\}_n$). In other words, the Q-learning module 124 in the machine learning computing system 120 may modify/adapt the Q-function (that is approximated/implemented by the neural network 134) based on actual results of the selected global QSV on the system 101.

An example follows. Suppose that the reward function is Q(x)=2x. In the Q(x)=2x example, the neural network 134 may implement 2x, i.e., for a value of 'x' given as input, the neural network 134 would produce a 2x output. The Q-learning (e.g., the Q-learning module 124 implementing Equations (1) or (2)) may determine that Q(x)=2x, e.g., by interacting with the C-RAN 100 and learning from actual observations. Therefore, the neural network 134 may approximate/implement and/or store the Q-function that the Q-learning module 124 has discovered/determined.

It should be noted that in this example, Q(x)=2x may not be the immediate reward, but the long-term reward. Accordingly, determining that Q(x)=2x for the optimal policy, from observations, is not trivial.

Evaluating each of the possible global QSV 132 configurations may be computationally intensive. Instead of the neural network, a lookup table may be used based on Equations (1) or (2). For example, Table 1 below shows an example lookup table for the Q(x)=2x example above:

TABLE 1

| x | Q(x) |
|---|------|
| 1 | 2 |
| 2.3 | 4.6 |
| 4 | 8 |
| 6 | 12 |
| 10 | 20 |

However, such a lookup table would likely grow too large. Therefore, it may be more efficient to train a neural network 134 with x as input and Q(x) as output so that the neural network implements mapping from x to Q(x), e.g., the neural network 134 may be a single neuron with a multiplying weight of 2 for the example of Q(x)=2x. In other words, using the neural network 134 to approximate/implement the reward function may be more computationally efficient than a lookup table, such as Table 1. Furthermore, instead of a single reward output in the neural-network 134, many output neurons could be utilized, each signifying a particular global QSV 132. This architecture would parallelize the computational load on the machine learning computing system 120 and enable quick global QSV 142 selection, e.g., on a cluster of servers implementing the machine learning computing system 120.

Furthermore, in some configurations, only a subset of wireless devices 110 may be considered for QSV selection at a time. Therefore, in some configurations, the set of the global QSVs 132 considered may include a QSV only for a subset (not all) of the wireless device 110 connected to the C-RAN 100. In a large C-RAN 110 deployment, it is reasonable that wireless device 110 in different regions of the site 102 do not influence each other significantly.

It should be noted that other function approximation mechanisms may be used (other than the neural network 134). In some configurations, the neural network 134 may be implemented using one or more lookup tables. In some configurations, the neural network 134 may include: (1) an input layer that receives the set of global QSVs 132 and the state 130 of the system 101; (2) an output layer that outputs an expected average throughput 140 for each global QSV in the set of global QSVs 132; and optionally (3) one or more "hidden" intermediate layers.

Figure 4:
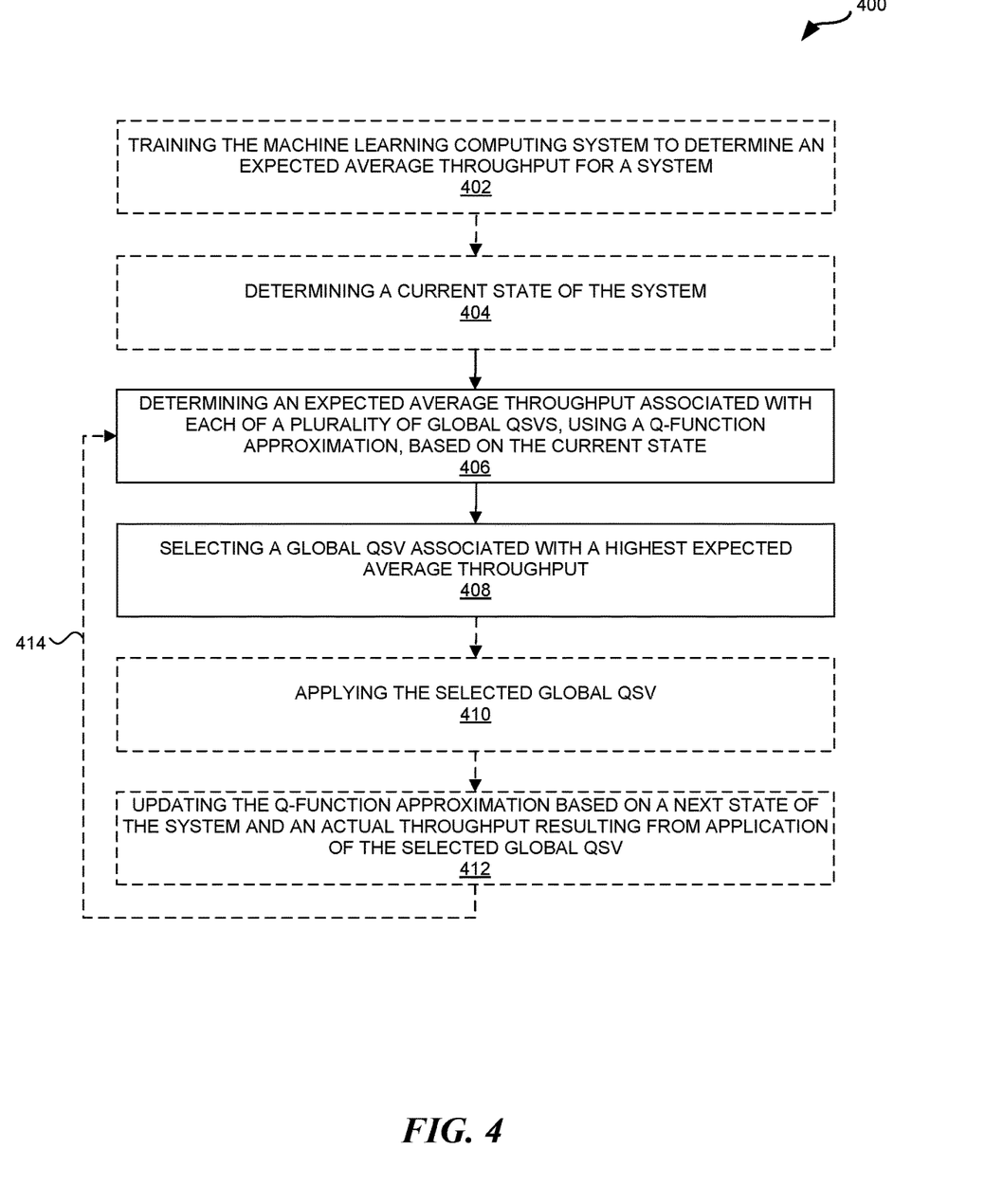
FIG. 4 is a flow diagram illustrating an exemplary method for dynamic quantized signature vector (QSV) selection for a C-RAN.

FIG. 4 is a flow diagram illustrating an exemplary method 400 for dynamic quantized signature vector (QSV) selection for a C-RAN 100. The method 400 may be performed, at least in part, by a system 101 that includes a machine learning computing system 120 and a C-RAN 100 (with at least one baseband controller 104 and multiple RPs 106 deployed at a site 102). The machine learning computing system 120 may approximate a Q-function (e.g., in a Q-function module 122) and use Q-learning (e.g., in a Q-learning module 124) to update/adapt the Q-function approximation based on actual results in the system 101.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling.

The method 400 begins at optional step 402 where the machine learning computing system 120 is trained to determine an expected average throughput for the system 101. The training may be performed in a simulation environment offline and may assume certain conditions in the system 101, such as the number and distribution of wireless devices 110, to produce assumed states 130 of the system 101.

The method 400 proceeds to step 404 where the current state 130 of the system 101 is determined. The state 130 of the system 101 may be determined by a baseband controller 104 in the C-RAN 100 based on one or more of the following: (1) the locations of at least one (e.g., all) of the active wireless devices 110 connected to the C-RAN 100 (represented by their SRS metric(s)) or the signature vectors for at least one (e.g., all) of the wireless devices 110 that are connected or the C-RAN 100; (2) a QoS priority of at least one (e.g., all) of the wireless devices 110 (e.g., the QoS priority may be a function of individual wireless device's QoS metrics, such as current throughput, packet delay, etc.; the QoS priority/scheduling priority may be used to select wireless devices for scheduling); (3) the backlogs associated with at least one (e.g., all) of the wireless devices 110; (4)

one or more channel conditions in the system 101 (e.g., indicated by Channel Quality Indicators (CQI) received at the RPs 106 and/or a Modulation and Coding Scheme (MCS) in use); and/or (5) the Block Error Rate (BLER) of at least one (e.g., all) of the wireless devices 110 in the system. The state 130 of the system 101 may be implemented as a vector, e.g., with at least one entry for each wireless device 110.

The method 400 proceeds to step 406 where an expected average throughput of the system 101 associated with each of a plurality of global QSVs 132 is determined, using a Q-function approximation, based on the current state 130. The plurality of global QSVs 132 may include all possible global QSVs for the system 101 or only a subset of all possible global QSVs.

The expected average throughput may be determined by the machine learning computing system 120. In some configurations, the neural network 134 may approximate/implement and/or store the Q-function itself. Equations (1) or (2) (in the Q-learning module 124) may be used to help estimate/determine the Q-function, e.g., the input $(s_n, \{QSV\}_n)$ and output (reward $R_n$) obtained from Equation (1) or (2) may be used to train the neural network 134 so that it would produce $R_n$ as output in response to the input $(s_n, \{QSV\}_n)$. Therefore, the neural network 134 may approximate/implement and/or store the Q-function that the Q-learning module 124 has discovered/determined.

The machine learning computing system 120 may receive the current state 130 as input from the C-RAN 100 (e.g., the baseband controller 104). The machine learning computing system 120 may store the plurality of global QSVs 132 in a memory, which may also be used as input to the neural network 134. Instead of throughput, other metrics may be used.

The method 400 proceeds to step 408 where a global QSV 142 associated with a highest expected average throughput is selected. For example, the machine learning computing system 120 (e.g., a QSV selection module 136 in the Q-function module 122) may select the global QSV 142 based on a comparison of the expected average throughputs from the neural network 134 associated with each of the plurality of global QSVs 132.

The method 400 proceeds to step 410 where the selected global QSV 142 is applied. Application of the selected global QSV 142 may include the C-RAN 100 (e.g., baseband controller 104) assigning (and/or re-assigning) some of the RPs 106 to communicate with some of the wireless devices 110 based on the global QSV 142. In other words, applying the selected global QSV 142 may include assigning, re-assigning, and/or mapping, for each wireless device 110, one or more RPs 106 to communicate with the wireless device 110.

As described above, the QSV for a particular wireless device 110 may be a vector that includes an element for each RP 106 in the C-RAN 100, where each element has one of a finite set of values, e.g., a value of "1" for elements corresponding to RPs 106 that are communicating with the particular wireless device 110 and a value of "0" for elements corresponding to RPs 106 that are not communicating with the particular wireless device 110. A global QSV may be the collective (e.g., aggregation of) QSVs of all (or a set of) wireless devices 110 connected to the C-RAN 100. For example, where a C-RAN 100 has N RPs 106 and M connected wireless devices 110, a particular global QSV may be an M×N (or N×M) matrix.

The method 400 proceeds to optional step 412 where the Q-function approximation (e.g., in a neural network 134) is updated based on a next state 130 (sn+1) of the system 101 and an actual throughput $(R_n)$ 138 resulting from application of the selected global QSV 142. In some configurations, updating the Q-function approximation may be performed by the machine learning computing system 120 and may include updating one or more weights in Equation (1) or (2). For example, the actual throughput $(R_n)$ 138 and/or the next state 130 $(s_{n+1})$ may be updated in Equation (1) or (2) based on the feedback from the C-RAN 100. In other words, the Q-learning module 124 in the machine learning computing system 120 may modify/adapt the Q-function (e.g., approximated/implemented by the neural network 134) based on actual results of the selected global QSV on the system 101. For example, the Q-learning module 124 may update the weights in Equation (1) or (2) (that is approximated by the neural network 134) using the actual throughput $(R_n)$ 138 and the state 130 of the system 101.

The method 400 proceeds to optional step 414 where the method 400 returns to step 406 using the next state 130 $(s_{n+1})$ of the system 101. Optionally, steps 408-414 may be repeated. In other words, steps 406-414 may be repeated periodically, e.g., every 200-500 ms.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. For example, where a computing device is described as performing an action, the computing device may carry out this action using at least one processor executing instructions stored on at least one memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary configurations", "in example configurations", "in some configurations", "according to some configurations", "in the configurations shown", "in other configurations", "configurations", "in examples", "examples", "in some examples", "some examples" and the like generally mean the particular feature, structure, or characteristic following the phrase is included in at least one configuration of the present disclosure, and may be included in more than one configuration of the present disclosure. In addition, such phrases do not necessarily refer to the same configurations or different configurations.

If the specification states a component or feature "may," "can," "could," or "might" be included or have a characteristic, that particular component or feature is not required to be included or have the characteristic.

In conclusion, the present disclosure provides novel systems, methods, and arrangements for dynamic QSV selection for a C-RAN. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Configurations

Example 1 includes a communication system, comprising: a plurality of radio points, each configured to exchange radio frequency (RF) signals with a plurality of wireless devices at a site; a baseband controller communicatively coupled to the plurality of radio points; and a machine learning computing system communicatively coupled to the baseband controller, wherein the machine learning computing system is configured to: determine an expected average throughput associated with each of a plurality of global quantized signature vectors (QSVs), using a Q-function approximation, based on a current state of the communication system; and select a global QSV associated with a highest expected average throughput.

Example 2 includes the communication system of Example 1, wherein the baseband controller is configured to determine the current state of the communication system.

Example 3 includes the communication system of any of Examples 1-2, wherein the baseband controller is configured to determine the current state of the communication system based on one or more of the following: a location of at least one of the wireless devices; a signature vector for at least one of the wireless devices; a Quality of Service (QoS) priority of at least one of the wireless devices; a backlog associated with at least one of the wireless devices; one or more channel conditions in the communication system; and a Block Error Rate (BLER) of at least one of the wireless devices.

Example 4 includes the communication system of any of Examples 1-3, wherein the baseband controller is configured to determine, for each wireless device, a QSV based on a signature vector for the wireless device, wherein the machine learning computing system is further configured to determine the global QSV based on at least some of the QSVs for the wireless devices.

Example 5 includes the communication system of Example 4, wherein each QSV is a vector that comprises an element for each radio point, wherein each element has a value of 1 for radio points that are communicating with the respective wireless device and a value of 0 for radio points that are not communicating with the respective wireless device.

Example 6 includes the communication system of any of Examples 1-5, wherein each signature vector for a wireless device is determined by the baseband controller based on at least one signal metric, wherein the at least one signal metric is determined at an RP based on a wireless signal received at the RP from the wireless device.

Example 7 includes the communication system of any of Examples 1-6, wherein the machine learning computing system is further configured to apply the selected global QSV by, for each of at least some of the wireless devices, assigning or re-assigning at least one of the radio points to communicate with the respective wireless device.

Example 8 includes the communication system of any of Examples 1-7, wherein the machine learning computing system is further configured to update the Q-function approximation based on a next state of the system and an actual throughput resulting from application of the selected global QSV.

Example 9 includes the communication system of Example 8, wherein the machine learning computing system is further configured to: determine an expected average throughput associated with each of a plurality of next QSVs, using the Q-function approximation, based on the next state of the communication system; and select a next global QSV associated with a highest expected average throughput.

Example 10 includes the communication system of Example 9, wherein the machine learning computing system is further configured to: apply the selected next global QSV by assigning or re-assigning at least one of the radio points to communicate with at least one of the wireless devices; and update the Q-function approximation.

Example 11 includes a method for dynamic quantized signature vector (QSV) selection in a communication system, the communication system comprising a baseband controller and a plurality of radio points, wherein each radio point is configured to exchange radio frequency (RF) signals with a plurality of wireless devices at a site, the method comprising: determining an expected average throughput associated with each of a plurality of global QSVs, using a Q-function approximation, based on a current state of the communication system; and selecting a global QSV associated with a highest expected average throughput.

Example 12 includes the method of Example 11, further comprising determining the current state of the communication system.

Example 13 includes the method of any of Examples 11-12, wherein the current state of the communication system is based on one or more of the following: a location of at least one of the wireless devices; a signature vector for at least one of the wireless devices; a Quality of Service (QoS) priority of at least one of the wireless devices; a backlog associated with at least one of the wireless devices; one or more channel conditions in the communication system; and a Block Error Rate (BLER) of at least one of the wireless devices.

Example 14 includes the method of any of Examples 11-13, further comprising: determining, for each wireless device, a QSV based on a signature vector for the wireless device, determining the global QSV based on at least some of the QSVs for the wireless devices.

Example 15 includes the method of Example 14, wherein each QSV is a vector that comprises an element for each radio point, wherein each element has a value of 1 for radio points that are communicating with the respective wireless device and a value of 0 for radio points that are not communicating with the respective wireless device.

Example 16 includes the method of any of Examples 11-15, wherein each signature vector for a wireless device is determined by the baseband controller based on at least one signal metric, wherein the at least one signal metric is determined at an RP based on a wireless signal received at the RP from the wireless device.

Example 17 includes the method of any of Examples 11-16, further comprising applying the selected global QSV by, for each of at least some of the wireless devices, assigning or re-assigning at least one of the radio points to communicate with the respective wireless device.

Example 18 includes the method of any of Examples 11-17, further comprising updating the Q-function approximation based on a next state of the system and an actual throughput resulting from application of the selected global QSV.

Example 19 includes the method of Example 18, further comprising: determining an expected average throughput associated with each of a plurality of next QSVs, using the Q-function approximation, based on the next state of the communication system; and selecting a next global QSV associated with a highest expected average throughput.

Example 20 includes the method of Example 19, further comprising: applying the selected next global QSV by assigning or re-assigning at least one of the radio points to communicate with at least one of the wireless devices; and updating the Q-function approximation.

The invention claimed is:

1. A communication system, comprising:
a plurality of radio points, each configured to exchange radio frequency (RF) signals with a plurality of wireless devices;
a baseband controller communicatively coupled to the plurality of radio points; and
a machine learning computing system communicatively coupled to the baseband controller, wherein the machine learning computing system is configured to:
determine an expected average throughput associated with each of a plurality of global quantized signature vectors (QSVs), using a Q-function approximation, based on a current state of the communication system;
select a global QSV associated with a highest expected average throughput; and
update the Q-function approximation based on a next state of the communication system and an actual throughput resulting from application of the selected global QSV.

2. The communication system of claim 1, wherein the baseband controller is configured to determine the current state of the communication system.

3. The communication system of claim 1, wherein the baseband controller is configured to determine the current state of the communication system based on one or more of the following:
a location of at least one of the wireless devices;
a signature vector for at least one of the wireless devices;
a Quality of Service (QoS) priority of at least one of the wireless devices;
a backlog associated with at least one of the wireless devices;
one or more channel conditions in the communication system; and
a Block Error Rate (BLER) of at least one of the wireless devices.

4. The communication system of claim 1,
wherein the baseband controller is configured to determine, for each wireless device, a QSV based on a signature vector for the wireless device; and
wherein the machine learning computing system is further configured to determine the global QSV based on at least some of the QSVs for the wireless devices.

5. The communication system of claim 4, wherein each QSV is a vector that comprises an element for each of the radio points, wherein each element has a value of 1 for any of the radio points that are communicating with the respective wireless device and a value of 0 for any of the radio points that are not communicating with the respective wireless device.

6. The communication system of claim 1, wherein each signature vector for a wireless device is determined by the baseband controller based on at least one signal metric, wherein the at least one signal metric is determined at an RP based on a wireless signal received at the RP from the wireless device.

7. The communication system of claim 1, wherein the machine learning computing system is further configured to apply the selected global QSV by, for each of at least some of the wireless devices, assigning or re-assigning at least one of the radio points to communicate with the respective wireless device.

8. The communication system of claim 1, wherein the machine learning computing system is further configured to:
determine an expected average throughput associated with each of a plurality of next QSVs, using the Q-function approximation, based on the next state of the communication system; and
select a next global QSV associated with the highest expected average throughput.

9. The communication system of claim 8, wherein the machine learning computing system is further configured to:
apply the selected next global QSV by assigning or re-assigning at least one of the radio points to communicate with at least one of the wireless devices; and
update the Q-function approximation.

10. The communication system of claim 1, wherein the expected average throughput is estimated using Q-learning to account for the current state and at least one future state of the communication system.

11. A method for dynamic quantized signature vector (QSV) selection in a communication system, the communication system comprising a baseband controller and a plurality of radio points, wherein each radio point is configured to exchange radio frequency (RF) signals with a plurality of wireless devices, the method comprising:
determining an expected average throughput associated with each of a plurality of global QSVs, using a Q-function approximation, based on a current state of the communication system;
selecting a global QSV associated with a highest expected average throughput; and
updating the Q-function approximation based on a next state of the communication system and an actual throughput resulting from application of the selected global QSV.

12. The method of claim 11, further comprising determining the current state of the communication system.

13. The method of claim 11, wherein the current state of the communication system is based on one or more of the following:
a location of at least one of the wireless devices;
a signature vector for at least one of the wireless devices;
a Quality of Service (QoS) priority of at least one of the wireless devices;
a backlog associated with at least one of the wireless devices;
one or more channel conditions in the communication system; and
a Block Error Rate (BLER) of at least one of the wireless devices.

14. The method of claim 11, further comprising:
determining, for each wireless device, a QSV based on a signature vector for the wireless device; and
determining the global QSV based on at least some of the QSVs for the wireless devices.

15. The method of claim 14, wherein each QSV is a vector that comprises an element for each of the radio points, wherein each element has a value of 1 for any of the radio points that are communicating with the respective wireless device and a value of 0 for any of the radio points that are not communicating with the respective wireless device.

16. The method of claim 11, wherein each signature vector for a wireless device is determined by the baseband controller based on at least one signal metric, wherein the at least one signal metric is determined at an RP based on a wireless signal received at the RP from the wireless device.

17. The method of claim 11, further comprising applying the selected global QSV by, for each of at least some of the wireless devices, assigning or re-assigning at least one of the radio points to communicate with the respective wireless device.

18. The method of claim 11, further comprising:
determining an expected average throughput associated with each of a plurality of next QSVs, using the Q-function approximation, based on the next state of the communication system; and
selecting a next global QSV associated with the highest expected average throughput.

19. The method of claim 18, further comprising:
applying the selected next global QSV by assigning or re-assigning at least one of the radio points to communicate with at least one of the wireless devices; and
updating the Q-function approximation.

* * * * *